3,481,148
FLUID FLOW MACHINE, ESPECIALLY FLUID
COUPLING AND FLUID BRAKE
Helmut Muller and Siegfried Mlacker, Heidenheim
(Brenz), Germany, assignors to Voith Getriebe KG,
Heidenheim (Brenz), Germany
Filed Apr. 24, 1967, Ser. No. 633,209
Claims priority, application Germany, May 7, 1966,
1,600,191
Int. Cl. F16h *41/26;* F16d *33/20*
U.S. Cl. 60—54                                    10 Claims

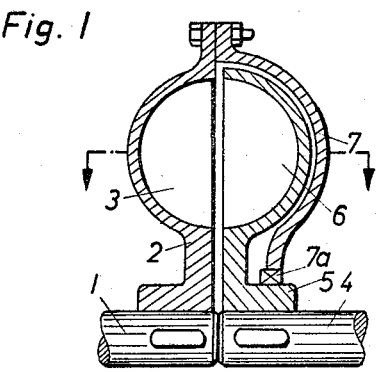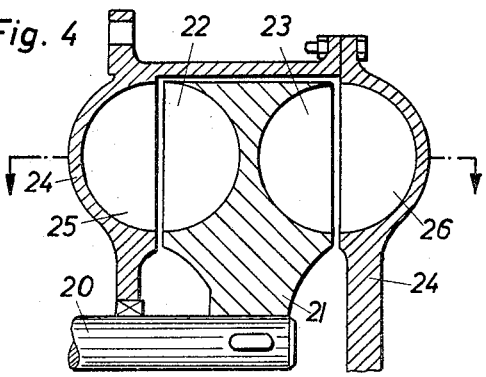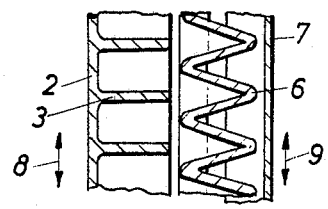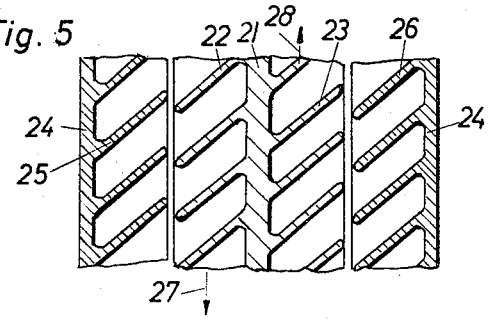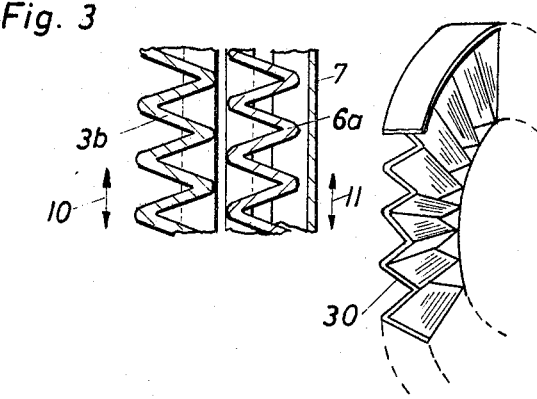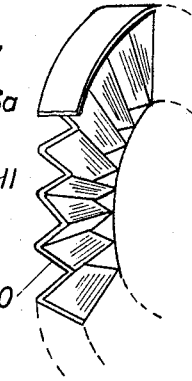

ABSTRACT OF THE DISCLOSURE

The present invention concerns a fluid flow device, especially fluid coupling and fluid brake, with at least one primary wheel and one secondary wheel in which at least one of said wheels is provided with two groups of blades, respectively inclined in opposite directions with regard to each other.

---

The present invention relates a fluid flow machine, especially fluid coupling and fluid brake, with primary and secondary blading in which at least one of said bladings has inclined blades. It is a well known fact that by inclining pump or turbine blades of fluid couplings in forward or rearward direction a higher transferable torque, i.e. a higher K-value, can be obtained. In this connection, the blades for the primary wheel are inclined in forward direction which means that the edges which face toward the secondary wheel are with regard to the blade base offset in the forward turning direction and/or the blades of the secondary wheel are inclined in rearward direction.

Such steps, however, are dependent on the direction of rotation which means that the inclined portion of the blades is effective solely in a certain direction of rotation. This fact, however, is disadvantageous with various drives, for instance with vehicles which have to be driven in both directions, if with drives of this type the fluid coupling or fluid brake is for reasons of space located behind the reversing transmission and is also disadvantageous with motor-less rail vehicles with a fluid brake. In the last mentioned instance the costs for a reversing transmission are porhibitive aside from the fact that also the operation of the reversing control would cause difficulties.

It is, therefore, an object of the present invention to provide a fluid coupling or fluid brake with inclined blades, the effectiveness of which will be independent of the direction of rotation of the respective wheel.

It is a further object of this invention to provide a fluid flow machine, especially fluid coupling and fluid brake, as set forth in the preceding paragraph, which will require a minimum of space.

These and other objects and advantages of the invention appear more clearly from the following specification in connection with the accompanying drawings, in which:

FIG. 1 is a partial axial section through a simple fluid coupling.

FIGS. 2 and 3 respectively illustrate in section a portion of a developed projection of two types of blading.

FIGS. 4, 11 and 12 are partial sections through a duplex fluid brake with separate blades for both working chambers.

FIG. 5 is a development of the blading used in the fluid brake of FIG. 4.

Figure 12:
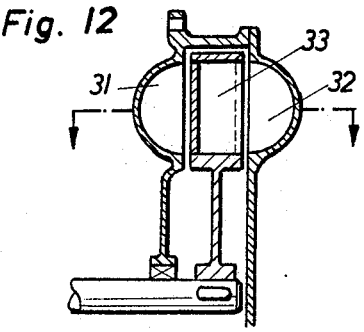
Figure 11:
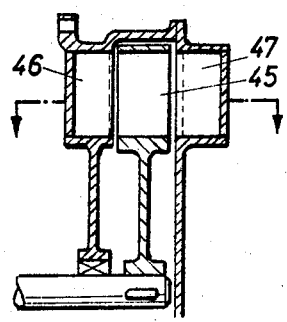
Figure 7:
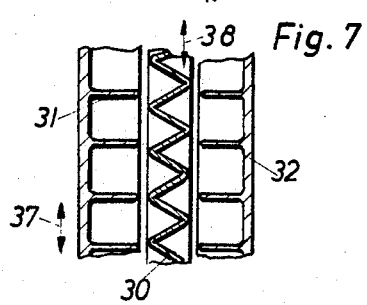
Figure 10:
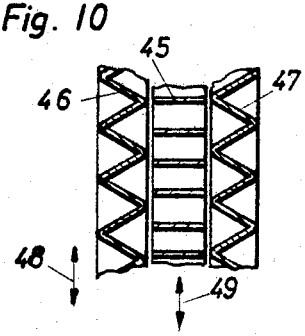

FIGS. 6 to 10 respectively illustrate different embodiments of a duplex fluid coupling and a duplex fluid brake with partially common blades for both working chambers, from which FIG. 7 is a development of the blading used in the fluid brake of FIG. 12 and FIG. 10 is a development of the blading used in the fluid brake of FIG. 11.

The fluid flow machine according to the present invention is characterized primarily in that the primary and/or secondary wheel is provided with blades inclined in opposite directions. Preferably the arrangement is such that one half of the total number of blades of the respective wheel is inclined in one direction while the other half is inclined in the opposite direction.

For fluid couplings or fluid brakes having a single primary blading only and a single secondary blading only, the blades of the primary and/or secondary wheel are in conformity with the present invention alternately inclined in opposite directions. Duplex fluid couplings or fluid brakes with two primary bladings each and with two secondary bladings each may also be so designed that at least one of the two wheels has the blades of one blade row inclined in forward direction and the blades of the other row inclined in the rearward direction. Most effective is an embodiment according to which of each double wheel one blade row has forwardly inclined blades while the other blade row has rearwardly inclined blades. With the customary design of such a coupling or blade comprising a primary or secondary wheel common to both working chambers and axially located between the rigidly interconnected primary or secondary wheel, the primary and/or secondary blades are all inclined in the same direction.

The arrangement according to the present invention comprises blades which are correspondingly inclined, that is, are symmetrically arranged, for both directions of rotation. Thus, the increase in the torque produced by the inclined position occurs in both directions of rotation. With the fluid coupling and fluid brake in duplex arrangement, both working chambers are during operation filled with working liquid. Also the respective blade row which is not so favorably hit by the fluid flow will in this instance bring about a co-rotation or braking effect and also will bring about a balancing of the axial thrust.

Another advantageous embodiment of the invention for use in connection with a fluid coupling or fluid brake in duplex arrangement consists in that a single row of blades alternately inclined in opposite direction and of an approximately uniform wall thickness is, while being acted upon from both sides, located between the two outer bladings. As a result thereof, while maintaining the above mentioned advantages, a particularly compact construction will be made possible, and also in this instance the axial thrust is completely balanced. Also the blades of one or both rows of blades of the outer wheel may for purposes of increasing the torque be inclined correspondingly. More specifically, the blades of one row will be inclined in the same direction or alternately inclined in opposite directions. With fluid couplings or fluid brakes in which the blades are inclined alternately on the circumference of the wheel in opposite directions, it is advisable, in conformity with a further development of the invention, to see to it that each two adjacent blades contact each other along a radially extending edge and that all blades of this wheel consist of a single correspondingly shaped sheet metal piece. In this way over the circumference of a wheel a maximum of inclined blades can be mounted from which fact the torque increase will benefit. Also advantages with regard to the manufacturing process can be realized.

More specifically, referring to the drawing, FIG. 1 shows a longitudinal section through a fluid coupling with a primary wheel 2 having primary blades 3 and being mounted on the primary shaft 1, while a secondary wheel 5 with secondary blades 6 is mounted on a secondary shaft 4. The secondary wheel 5 is surrounded by a cup 7 which is connected to the primary wheel 2 and is surrounded by a seal 7a. The primary blades, as shown in FIG. 2 in a development of the two bladings, are ordinary axis-parallel blades 3, whereas the secondary blades are represented by inclined blades 6 which are alternately inclined in opposite directions with regard to the axis of the coupling. The two directions of rotation are indicated by double arrows 8 and 9.

According to the fluid coupling of FIG. 3, the primary blades 3b as well as the secondary blades 6a are designed in the same manner as the blades 6 of FIG. 2. In addition to the advantage of a particularly favorable power transmission in both directions of rotation (arrows 10 and 11), there is obtained the further advantage that the blades 3b and 6a on the back side thereof have a relatively large surface and thus have a higher cooling possibility for the working fluid by the outer air with regard to heretofore known fluid couplings. It may also be mentioned that the primary wheel can also be employed as secondary wheel and that the secondary wheel can also be employed as primary wheel.

FIG. 4 shows a longitudinal section through a fluid brake in duplex arrangement. The primary shaft 20 to be braked carries the primary wheel 21 (rotor) which comprises two bladings 22 and 23 facing away from each other. The secondary wheel 24 with the bladings 25 and 26 arranged opposite the bladings 22 and 23 is stationarily arranged and forms the stator.

In FIG. 5 the blading is shown as a development. Accordingly, all bladings 22, 23, 25 and 26 are equipped with inclined blades and, more specifically, the blades are all inclined in the same direction while the blading in one working chamber is functionally opposite, i.e. with regard to the arrangement of primary and secondary wheel, to that of the other working chamber. Accordingly, the blades 22, 25 will be in the direction of rotation indicated by the arrow 27, and the blades 23, 26 will in the direction of rotation indicated by the arrow 28 have a particularly high brake torque. The other blades will due to the fact that both working chambers are always and at the same time filled with working fluid likewise bring about a braking torque even though somewhat smaller.

FIGS. 6 to 9 concern a fluid coupling or fluid brake in duplex arrangement in which between two outer bladings there is provided a common blading 30 adapted to be acted upon from both sides. This blading 30 of the primary or secondary wheel illustrated in perspective in FIG. 6 and adapted to be acted upon from both sides has inclined blades which are alternately inclined in opposite directions while adjacent blades are each interconnected along a longitudinal edge. This brings about an optimum exploitation of the available space. The blading 30 is produced of correspondingly bent sheet metal while on its outer circumference there may be provided an outer ring which favorably influences the annular flow within the range of these blades.

Figure 8:
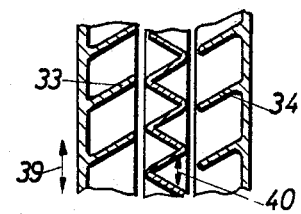
Figure 9:
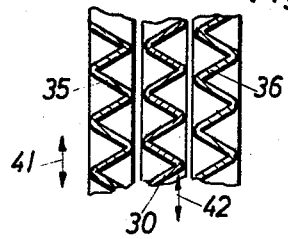

The two outer bladings may be designed in various ways which are shown in the form of a development in FIGS. 7 to 9. According to FIG. 7, the blades 31 and 32 arranged at opposite sides of the blades 30 represent ordinary blades, whereas the corresponding blades 33 and 34 are inclined in conformity with FIG. 8. According to FIG. 9, the blades 35 and 36 are designed in the manner of blades 30 located in the center which means they are alternately inclined in opposite directions.

With the fluid couplings in duplex arrangement according to FIGS. 7 to 9, the power transfer is the same in both directions (arrows 37 to 42) if both working circuits are filled.

The fluid coupling or fluid brake of FIG. 10 which follows the principle of FIGS. 6 to 9 has its intermediate wheel provided with bladings with axis-parallel blades 45 common to the two working chambers. On the other hand, the two rigidly interconnected outer wheels are equipped with blades 46 and 47 alternately inclined in opposite directions. The power transfer coresponds to that of FIGS. 7 to 9 (see arrows 48 and 49).

It is, of course, to be understood that the present invention is, by no means, limited to the particular embodiments shown in the drawings but also comprises any modifications within the scope of the appended claims.

What we claim is:

1. A hydrokinetic device having a housing in which at least one shaft has an axis of rotation and having at least two bladed wheels operable as a fluid coupling and fluid brake, comprising a system which includes at least one primary wheel having a set of primary blades and one secondary wheel having a set of secondary blades, one set of blades of the one wheel and another of the other wheel working together one with the other and forming at least one toroidal wo rking chamber within said housing, the chamber being in fluid communication freely with primary-blade working fluid and with secondary-blade working fluid, at least one of said sets of blades being provided with two groups of blades respectively inclined relative to an axial plane through said housing and shaft, the blades of the one group being inclined in the forward direction of rotation and the blades of the other group being inclined in the rearward direction of rotation, said blades being symmetrically arranged relative to opposite directions of rotation, so that the angles and working areas of said blades are the same in both directions.

2. A device according to claim 1, in which at least one of said sets of blades has half of its total number of blades inclined in one direction and the other half of its total number of blades inclined in the opposite direction.

3. A device according to claim 1 which comprises a duplex system with two working chambers in fluid communication with each other, one wheel having two sets of primary blades, and the other one having two sets of secondary blades, the blades of the one wheel being arranged back-to-back with regard to each other and the blades of the other wheel being arranged face-to-face with regard to each other, at least one of said wheels having all blades of its two sets of blades inclined all in the same direction relative to an axial plane.

4. A device according to claim 1, in which at least one of said wheels includes a set of blades alternately inclined in opposite directions.

5. A device according to claim 1, which comprises a duplex system with two working chambers having fluid interconnection to each other and having the same inner and outer diameters, one wheel having two sets of outer blades arranged face-to-face to each other and spaced from each other axially and opening to the other inner blades of the other wheel arranged back-to-back to each other between the outer blades, said two inner sets of blades being formed by a single line-up of blades alternately inclined in opposite directions all the blades of which having approximately uniform thickness throughout.

6. A device according to claim 5 in which the blades of said single line-up respectively engage each other along substantially radial lines.

7. A device according to claim 5, in which the blades of said single line-up respectively engage each other along substantially radial lines and are in a single sheet metal strip which has a zigzag structural configuration relative to the axial direction and which is bent annularly around the wheel.

8. A device according to claim 1 in which at least one of the sets of blades has blades thereof alternately directed in forward and rearward direction of said axis of rotation.

9. A device according to claim 1, which comprises a duplex system with two working chambers in fluid communication with each other, one wheel having two sets of outer blades arranged face-to-face with regard to each other and spaced from each other axially and opening to the working chamber of the other wheel arranged therebetween, said other wheel having two sets of inner blades arranged back-to-back to each other between the outer blades and opening to the outer blades, said two sets of inner blades being formed by a single line-up of blades alternately inclined in opposite directions and having approximately uniform thickness throughout and all the blades of each of said outer sets of blades of the one wheel being arranged in axial planes aligned with the axis of rotation.

10. A device according to claim 1, which comprises a duplex system with two working chambers in fluid communication with each other, one of said wheels having two sets of outer blades being arranged face-to-face to each other and being spaced from each other axially and opening to the other wheel arranged therebetween, said wheel having a set of inner blades between said outer blades, the blades of said inner set of blades being formed by a single line-up of blades only in axial planes aligned with the axis of rotation while each of said outer sets of blades is composed of a single line-up of blades alternately inclined in opposite directions.

References Cited

UNITED STATES PATENTS

| | | |
|---|---|---|
| 1,014,494 | 1/1912 | Leask. |
| 1,962,972 | 6/1934 | Stock. |
| 2,113,109 | 4/1938 | De La Mater. |
| 2,216,747 | 10/1940 | Klimek _____ 60—54 XR |
| 3,220,186 | 11/1965 | Burckhardt _____ 60—54 |

EDGAR W. GEOGHEGAN, Primary Examiner

U.S. Cl. X.R.

188—90; 192—58